United States Patent [19]

Noel

[11] Patent Number: 4,862,157

[45] Date of Patent: Aug. 29, 1989

[54] SIGNAL TRANSFER METHOD AND EQUIPMENT FOR ELECTRIC MACHINE EQUIPPED WITH THREE-PHASE POWER SUPPLY CABLE

[75] Inventor: Marc Noel, Neuilly en Thelle, France

[73] Assignee: Charbonnages De France, Paris, France

[21] Appl. No.: 147,101

[22] Filed: Jan. 20, 1988

Related U.S. Application Data

[63] Continuation of Ser. No. 747,367, Jun. 21, 1985, abandoned.

[30] Foreign Application Priority Data

Jul. 3, 1984 [FR] France ................................. 84 10526

[51] Int. Cl.[4] ............................................. H04Q 1/00
[52] U.S. Cl. .................................. 340/825; 340/310 R; 307/38
[58] Field of Search ........ 340/310 R, 310 A, 310 CP, 340/825.77, 825, 825.06, 825.14, 534; 299/1, 30; 307/38; 375/49

[56] References Cited

U.S. PATENT DOCUMENTS

| 2,307,771 | 1/1943 | Denton et al. ............. 340/310 R X |
| 3,337,992 | 8/1967 | Tolson ............................ 340/539 X |
| 3,696,383 | 10/1972 | Oishi et al. .................... 340/310 R |
| 4,065,763 | 12/1977 | Whyte et al. .................. 340/310 R |
| 4,287,596 | 9/1981 | Chari ...................................... 375/49 |

FOREIGN PATENT DOCUMENTS

| 0058754 | 10/1981 | European Pat. Off. . |
| 439471 | 1/1927 | Fed. Rep. of Germany . |
| 907995 | 3/1904 | France . |
| 2191796 | 1/1974 | France . |
| 1204087 | 9/1970 | United Kingdom . |
| 2113436 | 8/1983 | United Kingdom .................. 299/30 |

OTHER PUBLICATIONS

IEEE Transactions on Power Apparatus and Systems, vol. PAS-91, No. 2, Mars/Avril 1972, pp. 587-591, IEEE, New York, US; D. L. Hedrick et al., "765-kV Power Line Carrier Communications; III-Equipment Development and Design"; p. 587, FIG. 1.

Primary Examiner—Ulysses Weldon
Attorney, Agent, or Firm—Browdy and Neimark

[57] ABSTRACT

For transferring signals relative to an electric machine provided with a three-phase power supply cable with three phase conductors, there is applied a signal to be transmitted to a first point in the three-phase cable between anyone of the phase conductors of such cable and both of the other phase conductors taken conjointly, and a reception signal is picked up in another point in said cable between anyone of the phase conductors of such cable and both of the other phase conductors taken conjointly.

Preferably, similar capacitors are associated with each of the phase conductors in the cable at each end thereof, a galvanic separation transformer being disposed between such conductors, and the transmitter and the receiver, respectively, and an inductance being disposed between such transformers and conductors.

18 Claims, 7 Drawing Sheets

SIGNAL TRANSFER METHOD AND EQUIPMENT FOR ELECTRIC MACHINE EQUIPPED WITH THREE-PHASE POWER SUPPLY CABLE

This application is a continuation of application Ser. No. 747,367, filed June 21, 1985 now abandoned.

This invention relates to a method and equipment for transferring signals associated with an electric machine provided with a three-phase power supply cable; it relates more especially to the transfer of remote control orders to such machine and/or back transfer of measurement and visualization signals.

The invention notably applies to workyard, mine and quarry machines or appliances.

The Applicant has already proposed in its U.S. pat. appln. No. 665,111 of 10/26/1984 a direct view remote control method for a works machine and a transmitter and receiver assembly adapted to carry out such method, which notably apply to a cutting machine.

As is well known, remote control of works machines or appliances has the main purpose of keeping the driver or pilot of such machine away from a working zone considered to be dangerous in order to place him under optimum working conditios. The object of the above-mentioned patent application was to permit the driver to visually follow up the remote controlled operations while remaining under shelter. Such visual follow up permits the driver to easily control the remote controlled machine operation and allows the utilization of an electromagnetic radiation connection between the transmitter carried by the pilot and the receiver related to the remote controlled machine. Such radiation connection avoids the use of a supple cable that can be smashed or damaged.

In certain cases, for example with a cutting machine working into a steep slope face the working conditions can however be such that the driver can no longer find a site in which he is sufficiently protected while simultaneously keeping sufficient possibility of visualizing the remote controlled machine; only a "blind" remote control can then be envisaged.

As can be easily understood, a "blind" remote control requires provision of a bilateral connection between the driver and his machine; as a matter of fact, the driver who is sending commands to his machine must be able to check proper execution of such commands and satisfactory operation of the various elements in the machine.

It appears that, since the driver no longer ensures visual control of his machine, it is no longer useful for said driver to remain close to the machine; a cable remote control therefore appears to be necessary.

In case of a cutting (i.e. mining) machine for example, it can thus be decided that the driver should be in a pilot cabin (or station) located at such a distance, from the machine considered, that may reach up to about 1,000 m. Practically, such pilot station is preferably (but not necessarily) located close to the three-phase cable which supplies electric power to the machine. The mentioned distance therefore corresponds currently to a supple cable length of up to 200 m between the machine considered and a console called "works console" which is mainly used, as would be a switch, to switch on or switch off control of various equipments of the works in question, as well as a shielded cable length between the works console and the pilot station, that may reach up to 800 m.

The object of this invention is to provide transfer of signals concerning the remote controlled machine along such three-phase power supply cable more precisely along the phase conductors without having the ground conductor, which is however easily recognizable, intervene therein. Such transfer appears however diffisult to ensure reliably since three phase conductors are available for transmitting defined signals between two wires and since practical reasins require that such transfer should be provided without preliminary identification of such phase conductors (any replacement of a section of damaged cable must in fact be possible without taking any specific precautions).

The object of this invention is also a signal transfer method adapted to transmit as high an information flow rate as required. As a matter of fact, if the number of orders which are intended to be transmitted by remote control to a works machine is generally low (for example 6 all-or-nothing orders and 1 proportional order), the required number of back information data may be much higher, most often several tens thereof (for example, 12 measurements and 24 all-or-nothing information data).

The object of this invention is also a signal transfer equipment to provide bilateral connection between the pilot station and the remote controlled machine which implies two transmission and reception cross-channels comprising a minimum number of common elements so that any operational disturbance in one of such channels may generally occur without affecting the operationof the other channel.

The invention thus proposes a signal transfer method relating to an electric machine provided with a three-phase power supply cable for amplitude modulation of a carrier frequency characterized in that the signal to be transmitted is applied to a first point in the three-phase calbe between any one of the phase conductors of such cable, and both of the other phase conductors taken conjointly, and a reception signal is taken up from another point in said cable between any one of the phase conductors of such cable and the other two phase conductors taken conjointly.

The invention proposes, within the same spirit, an equipment for transferring signals associated with an electric machine provided with a three-phase power supply cable comprising a transmitter and a receiver tuned to a carrier frequency, characterized in that the transmitter and the receiver are connected at two distant points in the power supply cable, each being connected independently of one another between any one of the phase conductors and both of the other phase conductors taken conjointly.

It is to be noted that the invention in its most general form of embodiment relates to transfer of signals along a three-phase cable in one direction only for example for monitoring a preprogrammed machine or reversely, for remote control of a machine the monitoring of which is provided elsewhere. However, it is to be noted that the utilization of the invention is particularly advantageous in case of cross exchange of information data between two zones of a three-phase cable. The Applicant has actually noted that having the signals transit within the phase conductors confers them good immunity notably against electromagnetic disturbances, thereby resulting in a high signal/noise ratio, while the arrangement taught according to the invention for coupling the transmitters and the receivers by means of the power supply cable only leads, in the most unfavorable case, to a signal loss of about 6 dB, much lower than the signal/noise ratio obtained according to the invention, such ratio always remaining high.

The invention proposes more particularly that the signals to be transmitted should be distributed into cycles of several bit sequences when they are numerous. In practice, the sequences generally comprise 16 bits; if according to the invention three bits are used to provide synchronization of the bit sequences and one bit is used for synchronization of the sequence cycles, this leaves twelve bits for the transfer of information data proper. This confers a modular aspect to the invention in as much as electronic input/output cards comprise at present 12 distinct channels; a correspondence can be established between cards and bit sequences, the information data of one card occupying one bit sequence and the addition, from the electronic point of view, of a new card implying, from the informational point of view, only the addition of a new sequence in each cycle. It is contemplated according to the invention that the first sequence in each cycle should be characterized by the presence of a "1" in the associated cycle synchronization bit. The interest of such characteristic results from the fact that the Applicant was able to observe after many experiments that even if any spurious signals sometimes cause conversion of such bit from "1" to "0", they do not in practice produce any undesired value "1" in such signal synchronization bit so that reliable recovery of the synchronization in such cycle is facilitated.

Other objects, characteristics and advantages of this invention will appear from the following description given by way of non limitative example with reference to the attached drawings in which.

Figure 1:
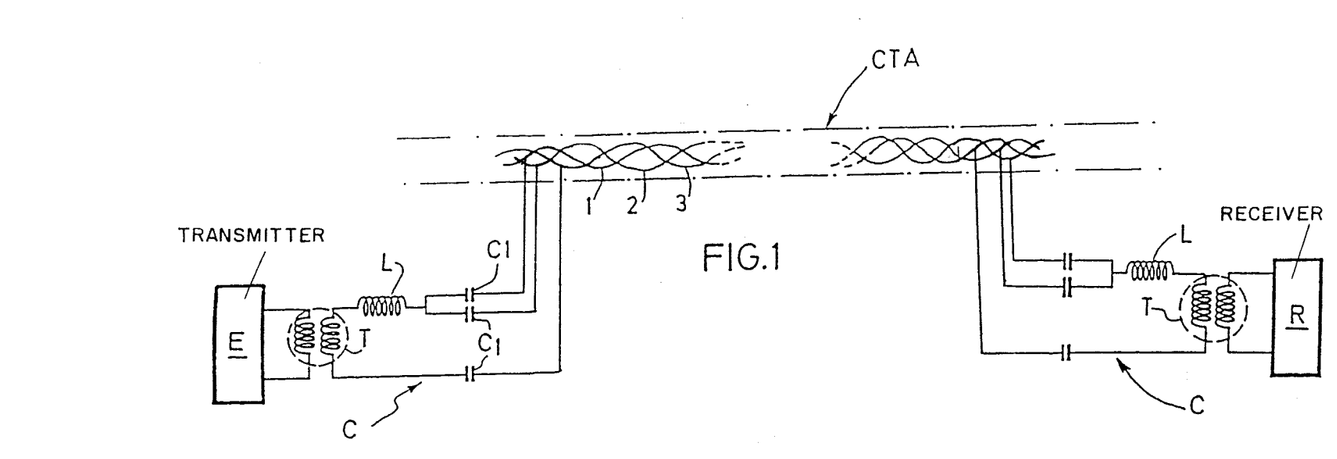
FIG. 1 is a schematic partly perspective view of an arrangement according to the invention of a transmitter and a receiver on a three-phase power supply cable.

The schematic circuit shown by way of example in FIG. 1 mainly comprises a transmitter E, a receiver R, a three-phase cable CTA and two identical couplers C, each inserted between the transmitter or the receiver and the facing end of the three-phase cable.

According to the invention, each coupler provides for connection of the associated transmitter or receiver between any one of the phase conductors 1, 2, 3 of the three-phase cable on the one hand, and on the other hand, both of the other phase conductors taken conjointly.

In the example shown, each coupler comprises three identical capacitors $C_1$ respectively associated with each of the phase conductors and one inductance L. A transformer T is also provided advantageously between the transmitter (or the receiver) and the three-phase cable to provide galvanic separation thereof.

Such a circuit has the advantage of easily providing approximate calculation of the optimum value of the various components as a function of the selected carrier frequency for signal transfer and the apparent impedances of the transmitter (or the receiver) and the three-phase cable CTA relative to the considered coupler (in a well-known manner).

In fact, the frequency is preferably selected as a function of the characteristics of the three-phase cable considered so as to optimize the transfer performances of the cable considered.

For example, in case of a cutting machine with a 1 KV-three-phase cable of a length of about 1000 m, frequencies of 300 to 400 kHz appeared to be optimum. Generally, tuning the coupler as a function of such a frequency of several hundreds of kiloHertz leads to reducing the influence of the low frequency of the network power supply (50 or 60 Hz depending on the respective countries).

Figure 2A:
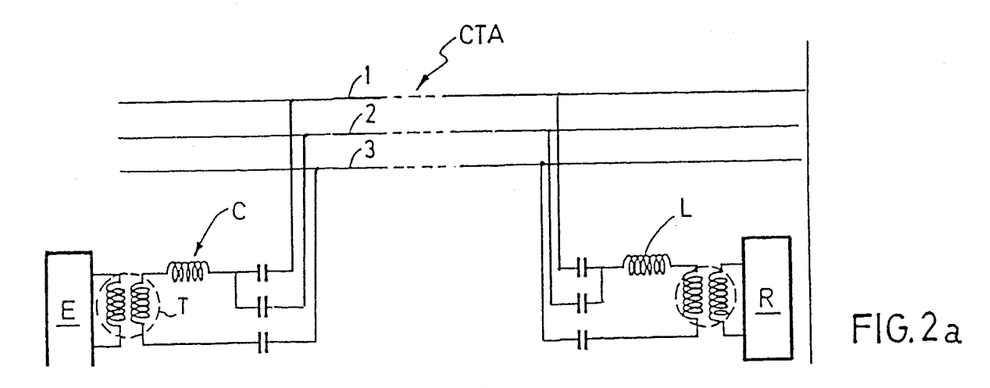
FIG. 2(a) is an electric diagram representing a first arrangement of FIG. 1.
Figure 2B:
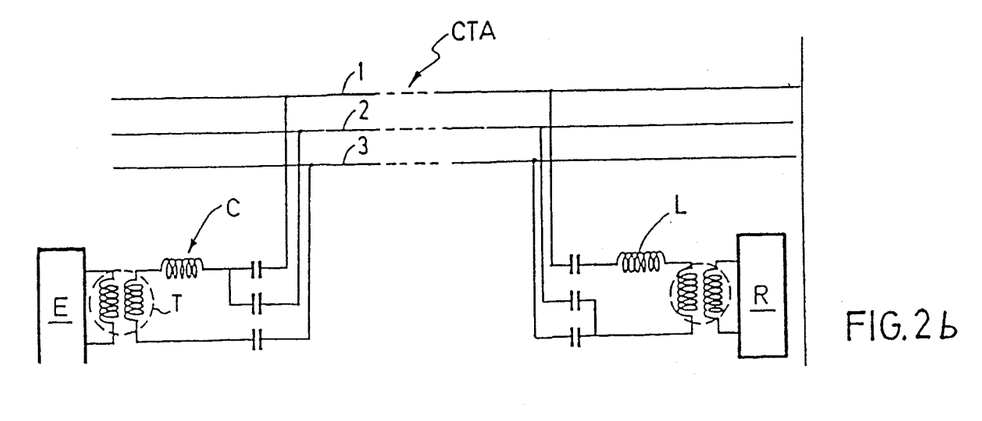
FIG. 2b is an electric diagram representing a second arrangement of FIG. 1.

Arbitrary connection of each coupler to the three phase conductors of the three-phase cable at each of the ends thereof produces six possible cases which, in view of the equivalence of both phase conductors taken conjointly for the connection of each coupler, comes down to the two distinct cases illustrated in FIG. 2 and FIG. 2b.

The circuit shown in FIG. 2 corresponds to the case wherein both phase conductors taken conjointly for connection of the couplers to the ends of the three-phase cable CTA are the same. This is a favorable case (there are two favorable cases out of the six possible cases) wherein the signal which is divided between conductors 1 and 2 at the output from the transmitter is recovered before application to the receiver, the latter receiving the "entire" signal.

On the other hand, if the phase conductors taken conjointly at the ends of the three-phase cable are different (this corresponds to four cases out of the six possible cases), as shown in FIG. 2b at the input to the right hand coupler associated with the receiver, the phase conductor 2 determines a short-circuit between both couplers. This is an unfavorable case wherein only about "half" the transmitter signal reaches the receiver. It appears however that this corresponds only to a signal loss of about 6 dB, and this, in view of optimization to which couplers C can be adapted and the relative immunity from any electromagnetic disturbances in the signals transiting in the phase conductors, remains compatible with finally obtaining a signal noise ratio higher than 40 dB at the receiver. The couplers C of figures 1, 2a and 2b therefore permit reliable transfer of signals; one speaks of signals which are "certain".

Figure 3:
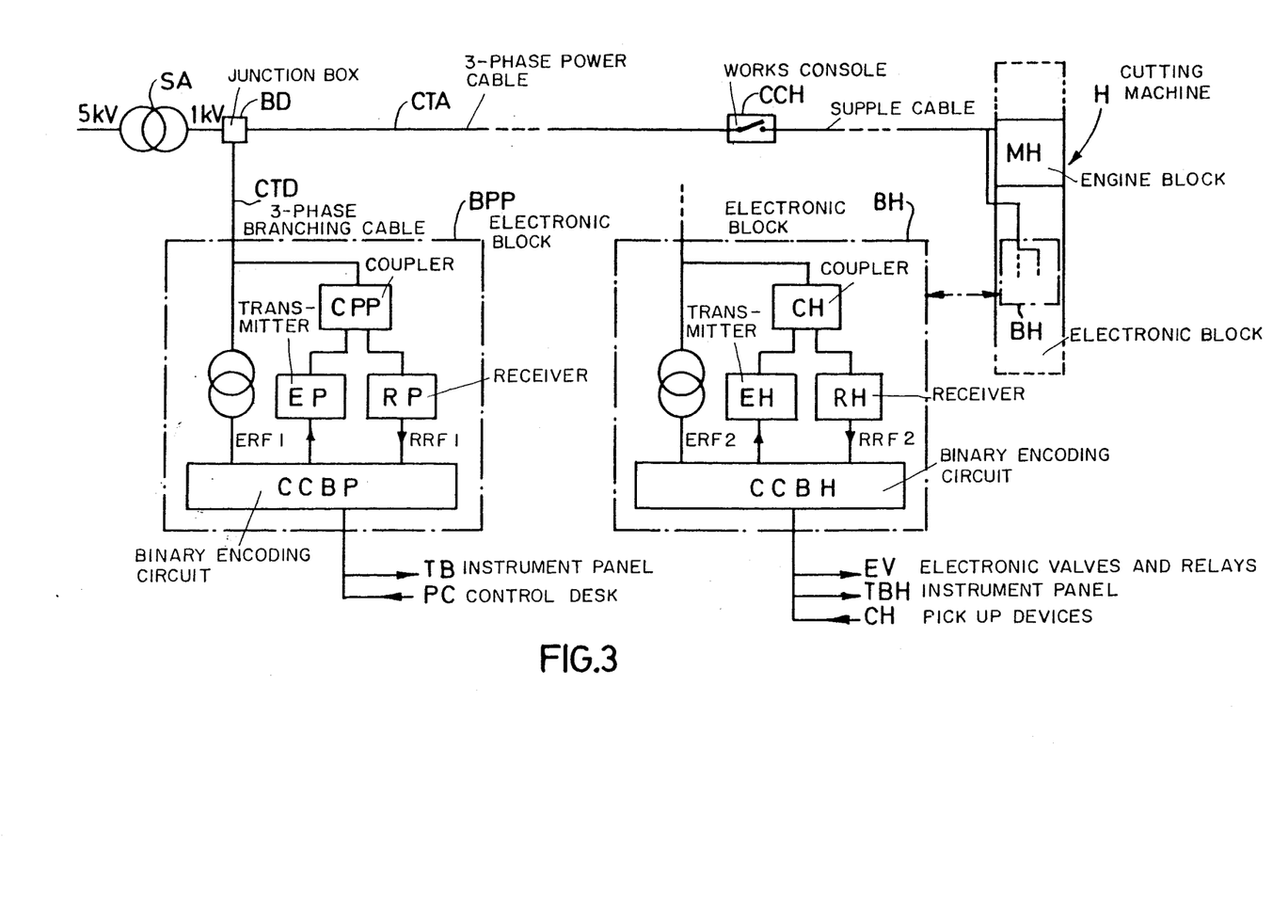
FIG. 3 is a block diagram of a "blind" remote control equipment according to the invention.

FIG. 3 represents by way of example a block diagram of a remote control equipment associated with a cutting machine H in a mine working face.

As is well known, a cutting (i.e. mining) machine which moves parallel to a working face in an alternating manner and which is provided with rotary drums carried by orientable arms which "scrape down" the ore to be extracted. The main commands necessary for the operation thereof are a proportional order corresponding to the direction and the speed of movement of the cutting machine in front of the working face, on the one hand, and on the other hand, all-or-nothing orders corresponding to a complementary upward or downward inclination of each of the arms associated with the rotary drums as well as the switching on of a safety brake. In order to suitably control the operation of the cutting machine, measurement signals are in practice required to give back the position of the mentioned arms and various inclinations with an accuracy of preferably 1% and the temperature of the engine and various hydraulic pressures with a little lower accuracy (for example, 3%), these being remote measurements. It is also required to check for the suitable operation or the state of various elements (all-or-nothing remote signalizations), such as the engine, essential electric valves (notably that associated with the safety brake), or else the thesigraph (which is a device for indicating the position of the cutting machine between its end positions and by means of which any possible overspeed of the cutting machine can be detected; then it is suitable to actuate the safety brake), these being signalization data.

The equipment on FIG. 3 is grafted on the three-phase power supply cable CTA connecting the cutting machine H to a power supply source SA (in practice, a 500 kVA transformer supplied with 5 kV, and feeding cable CTA with a voltage of about 1 kV).

The cable first comprises a shielded cable section up to a works console CCH and then, a supple section, up to the cutting machine H. Among the various parts of the latter, only the engine MH and the associated electronic block BH are indicated, the latter being connected to electric valves and relays EV, the instrument panel TBH of the cutting machine and pick up devices CH.

A control station disposed adjacent the power supply cable comprises an instrument panel TB where remote control measurements and remote control signalizations are visualized, the whole of which constitutes remote information data, and a control desk PC comprising push-buttons and sliders corresponding to proportional or all-or-nothing orders. This control desk and instrument panel constitute the inputs and outputs of an electronic block BPP associated with the control station. Such block is connected to a three-phase branching cable CTD connected to the power suply cable through a junction box BD.

The electronic blocks BPP and BH (shown on a larger scale near the cutting machine H) have similar overall structures, even if their components are more or less different. Both of such blocks comprise a coupler, respectively CPP and CH to provide for connection thereof to the branching cable CTD and the power supply cable CTA, a transmitter (EP, and EH respectively) and a receiver (RP and RH respectively), and an overall binary encoding circuit (CCBP and CCBH respectively) connected to the associated inputs and outputs. Such blocks are fed through subsidiary transformers from associated three-phase cables CTD and CTA.

According to one characteristic of the invention, the elements EP and RH, on the one hand, and on the other hand, EH and RP define independent transmission channels with the corresponding portions of the associated binary encoding circuits; they comprise in common only the couplers and three-phase cables which are entirely reliable elements.

Figure 4:
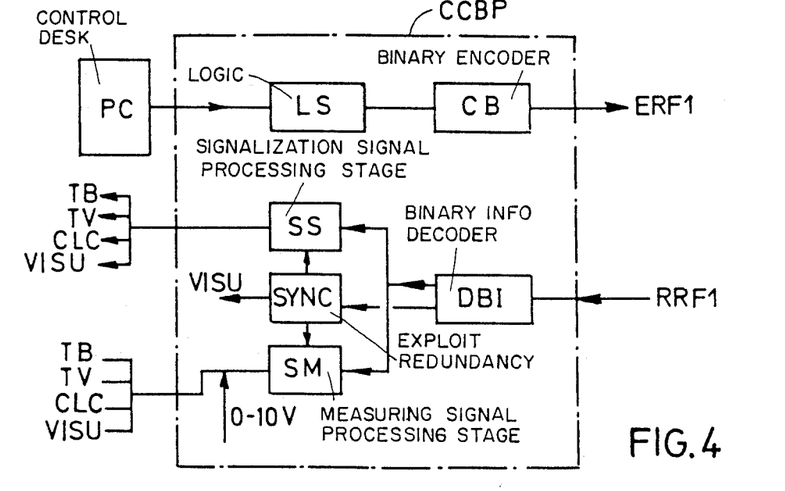
FIG. 4 is a block diagram of the overall circuit of binary encoding associated with the pilot station of FIG. 3.
Figure 5:
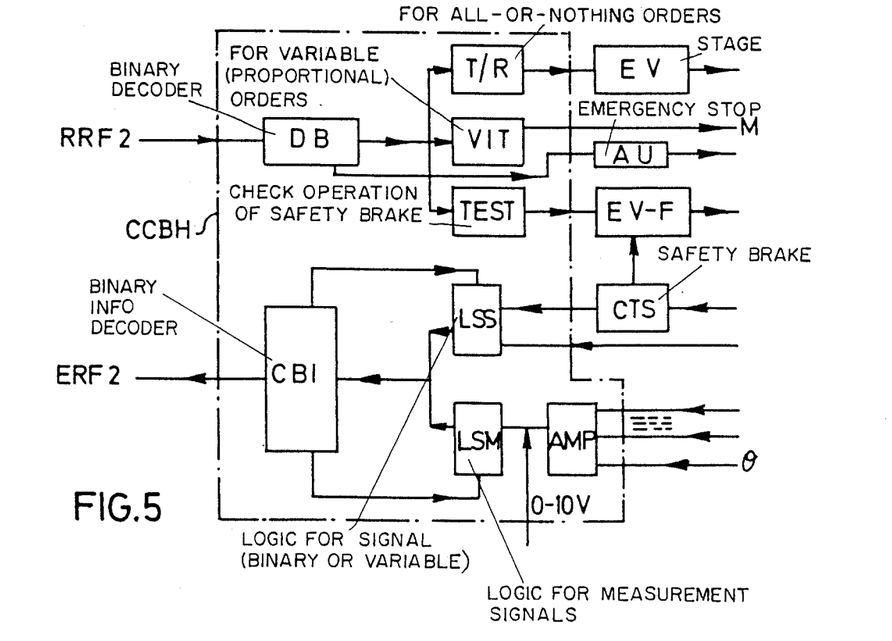
FIG. 5 is a block diagram of the overall circuit of binary encoding associated with the cutting machine of FIG. 3.

The binary encoding circuits associated with the control station and the cutting machine respectively are shown in detail in FIGS. 4 and 5; their upper sections correspond to the transmission channel associated with the remote control commands whereas their lower sections correspond to the transmission channel associated with the remote information data. The overall structure of such channels is similar to the remote control channels proposed in the patent application Ser. No. 665,111 above, the specification of which is described further herein.

The upper section of the binary encoding circuit CCBP associated with the control station (see FIG. 4) first comprises a logic LS specific to the machine to be controlled, and thus, to the cutting machine considered. Such logic "filters out", regroups and guides the commands supplied by teh driver through the control desk PC so as to keep only compatible commands that can be transmitted simultaneously. Any command errors, for example, undesired depression of two push-buttons, can thus be eliminated. The commands retained by the specific logic and translated to binary form pass thereafter through a binary encoder CB which ensures simultaneously the encoding of the desired commands to successive logic signals within successive bit sequences. The so obtained sequential signal is then transmitted to the transmitter EP which accordingly modulates a carrier frequency (selected for example to be 400 kHz, within the frequency range that reduces to a minimum the attenuation occurring upon transfer along the power supply cable considered), before injecting it by means of the coupler into the branching cable CTD and then, the power supply cable CTA.

The electric wave picked up by the coupler CH associated with the cutting machine is transmitted to the receiver RH tuned to that 400 kHz carrier frequency (see the upper section of FIG. 5); the receiver restores a demodulated signal to a binary decoder DB. To such binary decoder is actually associated a decoding enable stage for checking predetermined validity criteria. The binary orders so obtained in parallel are processed by a specific output logic and then an output stage. In the example considered the specific logic output comprises a circuit VIT for taking into account the variable (or proportional) order associated tothe direction and speed of movement of the cutting machine and a circuit T/R for taking into account the all-or-nothing orders. Another circuit TEST is also provided advantageously to check for good operation of the safety brake EV-F. In fact, the safety brake is also actuated in case of zero speed. It is reminded that the binary control of the speed order presupposes preliminary definition of intermediary values between end values of such orders, depending on the driver's needs. The circuit T/R controls the variable electric valves or relays through a stage EV. For safety reasons, an emergency stop stage AU is provided for accomplishing complete stop of the machine in case of any incident.

Figure 6:
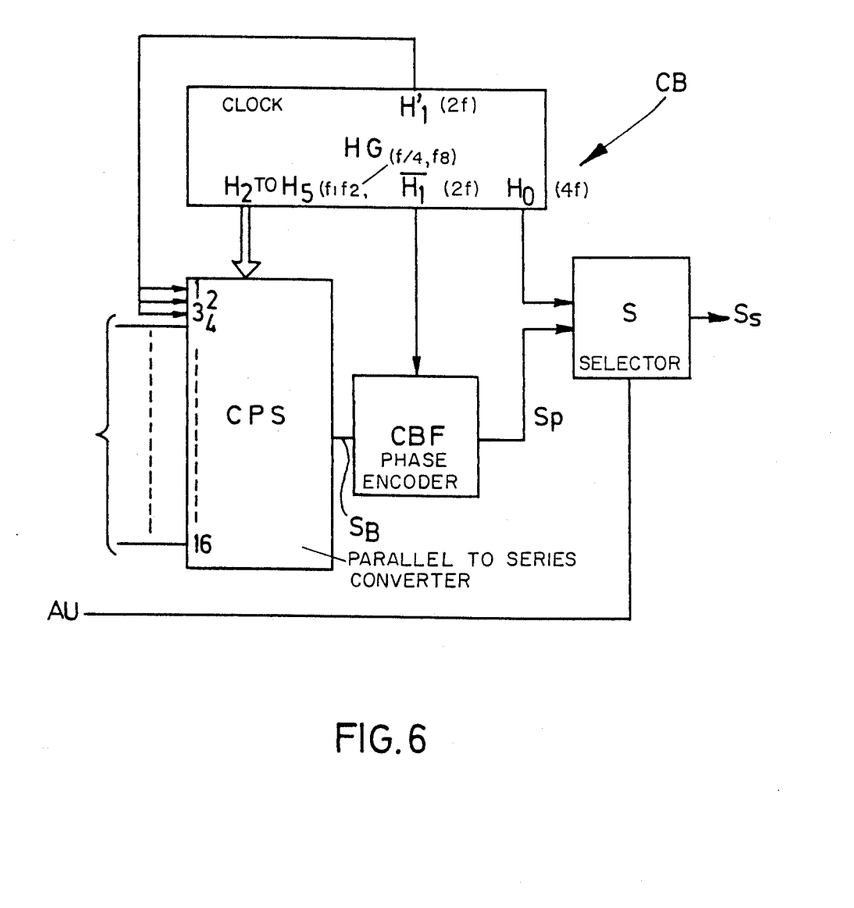
FIG. 6 is a block diagram of the binary encoder of FIG. 4.

FIG. 6 shows the arrangement of the main elements constituting the binary encoder CB. It comprises a clock HG, a parallel series converter CPS, a biphase encoder CBF and a selector S.

The clock HG supplies various signals the role of which will appear later on and which can be defined relative to a predetermined frequency f, save for ½ ratios:

$H_o$ of frequency 4f;

$\overline{H}_1$ and $H'_1$ of frequency 2f with a lagging phase shift of one quarter of a cycle between $H'_1$ and $\overline{H}_1$; and $H_2$, $H_3$, $H_4$, $H_5$ corresponding to frequencies f, f/2, f/4, and f/8.

Figure 7:
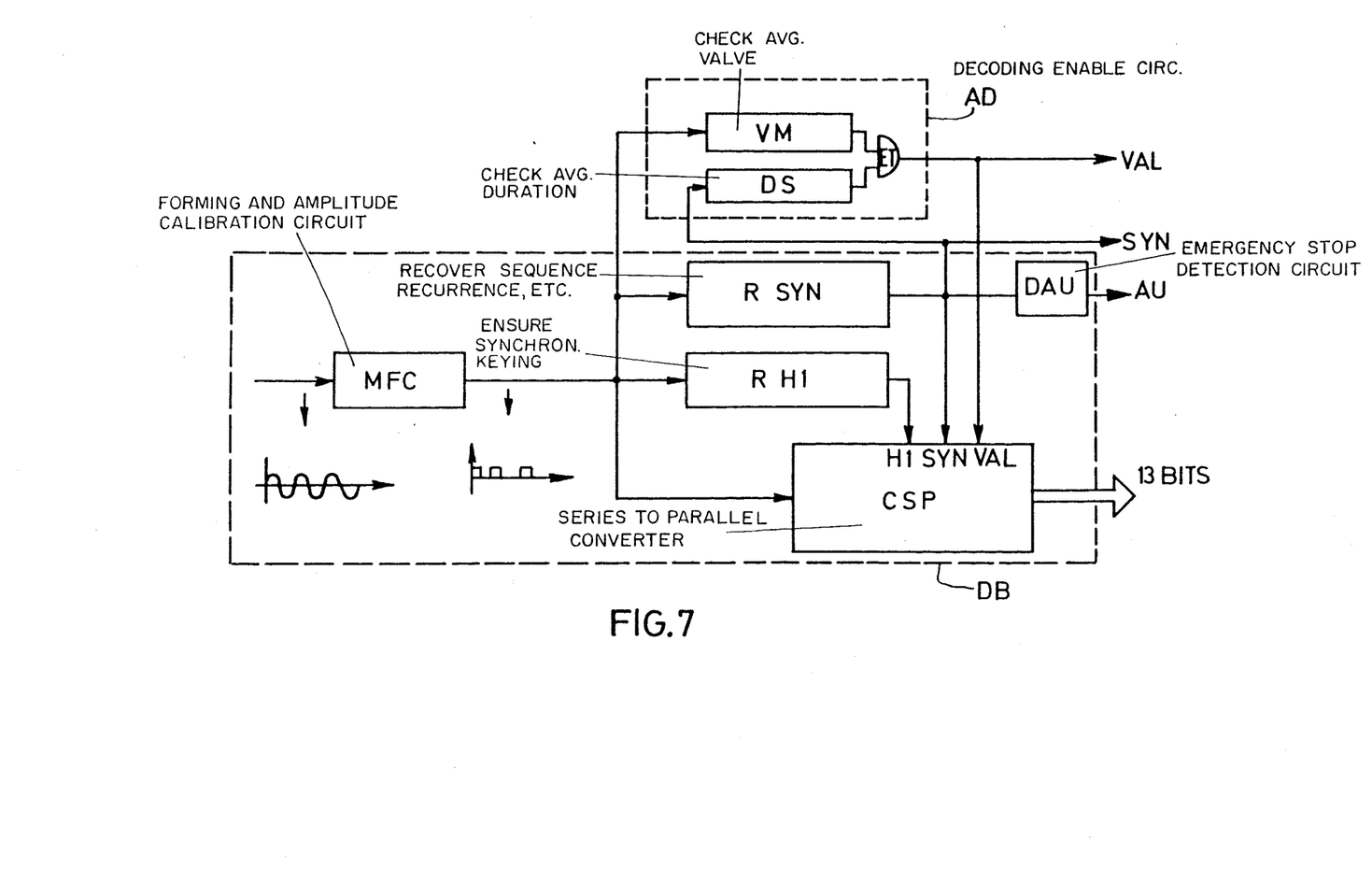
FIG. 7 is a block diagram of the binary decoder of FIG. 5.

FIG. 7 shows the arrangement of the main constitutive elements of the binary decoder DB. The decoder first comprises a forming and amplitude calibration circuit MFC to convert the demodulated signal supplied by the receiver RH to a binary signal. The binary signal is actually not strictly similar to the signal applied to the transmitter EP; recognition circuits are provided after circuit MFC to check for alteration in the binary signal between the control station and the cutting machine either for elimination thereof or for interrupting the decoding step.

The main point in the decoding is recovery of the rhythms in order to accurately define the beginning of each bit sequence and the position of each bit in each sequence so as to correctly control successive conversions of the signal calibrated by a series-parallel converter CSP. Thus, a circuit RSYN has the purpose of recovering the sequence recurrence frequency from the calibrated binary signal and initiating a conversion at the beginning of each sequence. Such circuit RSYN is associated with an emergency stop detection circuit DAU for reasons which will appear later on. An RH1 circuit is also provided for ensuring synchronization keying with the bit recurrent frequency in each sequence.

In parallel to the binary decoder, a decoding enable circuit AD is mounted to supply an enable signal VAL to the converter CSP. In the example shown, said circuit AD comprises a circuit VM which checks for credibility of the average value ofthe calibrated signal, and a circuit DS within checks for credibility of the average duration of the sequences from the signal applied by the circuit RSYN. An AND gate is connected to the outputs from circuits VM and DS so as to supply the trigger signal VAL to the converter only if each credibility test is verified. In the reversed case, no conversion of the calibrated binary signal is authorized.

A supplementary enable circuit, not shown, preferably intervenes at the output from converter CSP to exploit redundancy which normally should appear between bits of successive sequences; such enable circuit only transmits the parallel binary signals to the various circuits VIT, T/R and TEST after checking that such signals are repeated identically for a given number of successive sequences without the decoding enable circuit interrupting the conversions through the converter CSP (the state of the outputs from the latter actually remains blocked as long as a new conversion was not initiated).

Figure 8:
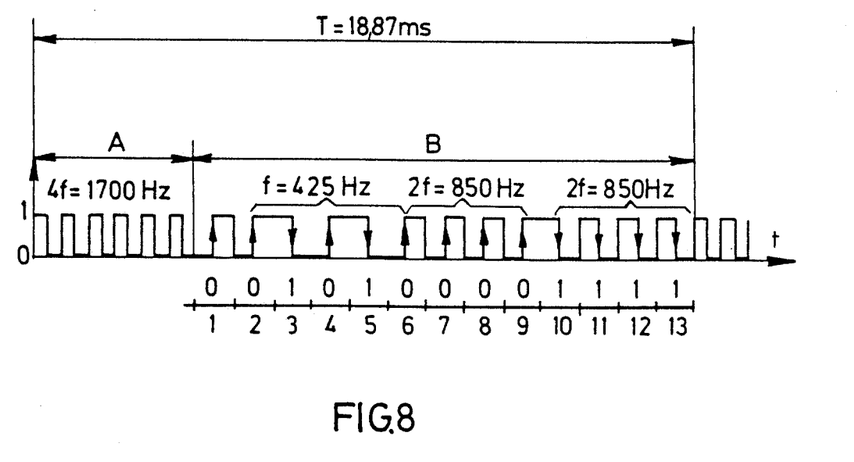
FIG. 8 is a diagram representing a biphase encoded binary sequence according to the invention.

FIG. 8 shows an exemplifying sequence of a sequential binary signal contemplated by this invention (to be related to the teachings in the patent application mentioned at the beginning of this specification). Such sequence comprises 16 available bits (this number is practically selected to be equal to the number of parallel inputs-outputs of the used converters). The first three bits are actually occupied by a synchronization signal (two crenels by bit) of a frequency equal to $H_o = 4f$; 13 bits remain available for information transfer.

According to an advantageous characteristic of this invention, the encoding of the information bits is of the biphase type, with the value of the binary state encoded in each information bit being translated by the sense of a binary transition in the middle of each bit so that an upward middle transition corresponds to the state O and reversely. The interest in such biphase encoding is that the binary value of the binary signal is equal to half the maximum level. Depending on the successive information bits being of the same value, or of distinct values, intermediary signals appear, of frequency 2f or f, i.e. either one half or a quarter of synchronization frequency $H_o$. Taking into account that the squared signals at f and 2f present only harmonic frequencies of odd numbers, the spectrum components of the sequential signal concerning the information bits on the one hand, and on the other hand, the synchronization, are well distinct on the frequency scale. This property permits at the reception to extract from the calibrated binary signal such synchronization signals as required are for decoding each sequence. Such property also makes it possible to define an emergency stop command by introducing the synchronization frequency into the information bits; such definition of the emergency stop permits particularly easy recognition thereof during the decoding.

In the example shown on FIG. 8, the synchronization frequency is 1700 Hz while the sequence repetition frequency $H_5$ (f/8) corresponds to a sequence duration of 18.87 ms.

The processing of the sequention binary signal by the binary encoder of FIG. 6 can be described as follows, taking into account the previously given definitions of the clock signals $H_o$, $\overline{H}_1$ and $H'_1$: a rough signal is first produced; it takes again $H'_1$ for the three first bits in the sequence and takes a zero level for the binary state O of the initial signal supplied by the converter CPS and a maximum level for the binary states "1" of such initial signal; thereafter an encoded signal is produced, having a maximum level when the rough signal and $\overline{H}_1$ are of the same level and a minimum level when the rough signal and $\overline{H}_1$ are of different levels. Such a encoded signal constitutes the output signal unless an emergency stop command substitutes the synchronization signal $H_o$ therefor.

The remote control information channel represented in the lower section of the FIGS. 4 and 5 has a structure substantially similar to that of the remote control channel which has just been described, the main difference therebetween resulting from the fact that, in view of the high number of remote information data, these are distributed according to the invention into cycles of several sequences (for example 10), the information flow rate being maintained high due to a higher frequency than for transmission of remote control orders. Moreover, amplitude calibration of the measurement signals is required before encoding.

The transmission section shown in the lower part of FIG. 5 thus comprises from the right hand side to the left a specific logic LSS associated with the signalization (all-or-nothing, or variable) signals and a specific logic LSM, associated with the measurement signals, downstream of a calibration amplifier AMP. Among the important signalization signals, the state of the thesigraph and overspeed sensor CTS for furnishing the position of the cutting machine between its end positios is to be noted, such sensor being also ready to detect any possible excessive speed of motion in which case the safety brake EV-F must be actuated. The temperature in the engine of the cutting machine ranges among the important measurement signals.

In view of current capacities of parallel-series converters used in practice, it is suitable to initiate several successive conversions to take into account the various useful control information signals; a cycle of several sequences is then necessary for transmitting the whole of the information data.

Such sequence cycles are thereafter encoded in biphase as previously described in a binary information encoder CBI. A carrier frequency distinct from the remote control carrier frequency is selected so as to be, for example, 335 kHZ.

At the reception, the demodulated signal RRF1 supplied by the receiver is applied to a binary information decoder DBI which calibrates and forms it and then, after recognition of the rhythms (notably the cycle frequency), and checking the predetermined credibility criteria, it ensures successive series-parallel conversions and distributes the signals between a signalization signal processing stage SS and a measurement signal processing stage SM. The latter are converted, if need be, to analog form. A stage SYNC is preferably provided to exploit the redundancy that must be presented by the cycle synchronization signals.

The remote information data are displayed on the instrument panel TB, on the one hand, and on the other hand, however, they may also be transmitted, through a remote monitoring circuit TV extended up to the ground surface, to a computer CLC or a display panel VISU for the intervention personnel.

Figure 9:
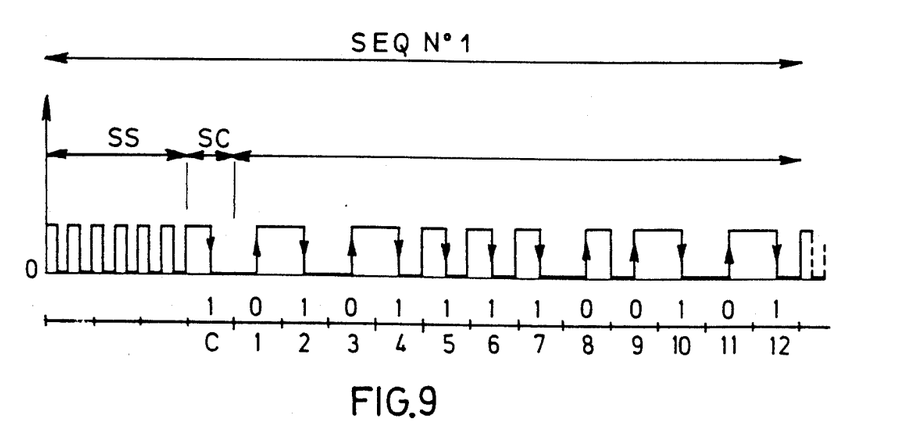
FIG. 9 is a diagram representing the first biphase encoded binary sequence of a cycle according to the invention.

FIG. 9 represents an example of a first binary sequence of a cycle. Such sequence differs from that represented in FIG. 8 only by the presence of a single bit of cycle synchronization after the three synchronization bits, thereby leaving twelve information bits.

The Applicant has actually noticed that recognition of the cycle rhythm can be obtained by means of a single bit, the binary state of which is 1 for the first sequence in the cycle, while its binary state is 0 for the following sequences. Recognition of the cycle rhythm is thus easy and reliable, no spurious bit "1" having been observed during the experiments, however numerous, and the redundancy relative to such cycle synchronization bits being easy to exploit.

It will be understood that the foregoing description was only proposed by way of illustration and that many modifications can be suggested by the man skilled in the art without however departing from the scope of the invention. Thus, the specific structure of the couplers can be charged. A slight dissymmetry in the method of connecting both conductors to be taken conjointly for connecting a transmitter or a receiver to the three-phase cable considered is admissible, although this would induce, on connecting both couplers in two poits of said cables, signal losses that may exceed the previously mentioned value of 6 dB in certain unfavorable cases. It might be reminded that, depending on the characteristics of the three-phase cable, it is possible to select optimum carrier frequencies so as to deduce therefrom optimum values for the impedances of the various constitutive elements in the coupler. It is to be noted finally that in case of cross exchange between remote control and remote information orders, standard and/or modular elements intervene in both signal transmission channels; the elements in one remote information channel can actually be used in a remote control channel, due mainly to the possibility of taking into account an emergency stop signal. Such elements are particularly advantageous if a large number of commands are to be transmitted.

According to an advantageous application of this invention, the signal transfer equipment just described above is completed by telephone connections with the ground, so as to dispose on the ground surface at a distance from the electric installation proper, an encoding-decoding system with a control console and a display panel, in replacement of, or addition to, the endoding-decoding system with control console and display panel, which was just described above. Such adaptation essentially comes down to realizing, in FIG. 3, telephone connections between EP and RP, on the one hand, and on the other hand, with CCBP, and using independent power supplies.

I claim:

1. A method for transferring on a frequency carrier, signals relative to an electric machine powered through a three-phase power supply with three phase-conductors in a cable comprising the steps of supplying an input signal to two terminals at a first location with an output signal representative of said input signal caused to be received at a second location;

connecting two of said three phase-conductors of said cable to a first of said two terminals at said first location;

connecting the remaining third one of said three phase-conductors to a second of said two terminals at said first location;

connecting one of said phase-conductors as a first terminal at said second location;

and connecting the remaining two of said three phase-conductors as a second terminal at said second location with one of said three phase-conductors at said second location connected to one of said phase-conductors of a different phase than the phase of said phase-conductor to which it is connected to at said first location.

2. The method of claim 1 further comprising transferring of a signal input in at least one direction to a signal output between said first and second locations without interfering as a result of the connections at said first and second locations with a supply of three-phase power.

3. The method of claim 1 wherein said phase-conductors of said cable are three conductors without a ground conductor running in the cable.

4. The method of claim 1 wherein said cable completes its circuitry through said cable with said three phase-conductors.

5. The method of claim 1 further comprising the steps of transmitting remote control orders for a remote controlled machine in one direction between said first and second locations and transmitting measurement and signal information data back from said machine in the other direction between said first and second locations;

said remote control orders being contained in said input signal at said first location, said measurement and signal information data being contained in a further input signal input at said first and second terminals at said second location, and a further output signal corresponding to said further input signal being an output across said terminals at said first location.

6. The method of claim 5 wherein said remote control orders are transmitted in the form of biphase encoded bit sequences and said measurement and signal information data are transmitted in the form of biphase encoded bit sequence cycles.

7. The method of claim 1 further comprising supplying input signal of digital binary encoded signals at said first location and receiving an output signal of digital binary decoded signals at said second location;

connecting a first signal means to said first and second terminals of one of said first and second locations, with said first signal means including
    a transmitter of a signal input across said first and second terminals of said at least one of said first and second locations;

connecting binary encoding means to send digital signals to said transmitter;

connecting a second signal means to said first and second terminals of the other of said first and second locations, with said second signal means including
    a receiver of a signal output across said first and second terminals of said other of said first and second locations;

connecting binary decoding means to receive digital signals from said receiver;

transferring said digital signals at said signal input in at least one direction to said signal output between said first and second locations without interfering as a result of the connections at said first and second locations with supplying of three-phase power;

at each of said first and second locations connecting three capacitors, one of which is connected to each one of said connectors and to one of said terminals, and connecting an inductance having one of its ends connected to one of said terminals at a said location in series with said capacitors connected to said one of said terminals at that location.

8. The method of claim 7 further comprising the step of
    encoding said input encoded signals transmitted by said three phase-conductors between said first and second locations to binary biphase form in sequences of 16 bits, of which the first three bits are filled by a synchronization signal having a cycle period equal to half the duration of one bit.

9. The method of claim 8 further comprising the step of
    encoding said input encoded signals transmitted by said three phase-conductors between said first and second locations to binary biphase form in cycles of several 16 bit sequences, the fourth bit in the sequence being in state 1 for the first sequence in each said cycle and being in the state 0 for the following sequences.

10. A device for transferring signals on a frequency carrier between a first location and a second location, while simultaneously supplying power between said locations comprising
    a three-phase power supply cable extending between said first and second locations having three phase-conductors for transferring power therebetween at a respective frequency with three phrases;
    first means for commonly connecting at said first location two of said three phase conductors as a first terminal at said first location, and to a third of said three phase-conductors as a second terminal at said first location;
    second means for connecting at said second location one of said phase-conductors as a first terminal at said second location, and the remaining two of said three phase-conductors as a second terminal at said second location;
    one of said three phase-conductors at said second location connected to one of said two remaining phase-conductors of a different phase than the phase of said phase-conductor to which it is connected to at said first location;
    first signal means connected to said first and second terminals of one of said first and second locations,
    second signal means connected to said first and second terminals of the other of said first and second locations;
    a signal input transferred in at least one direction to a signal output between said first and second locations without interfering as a result of the connections at said first and second locations with a supply of three-phase power.

11. The device of claim 10 wherein
said first signal includes
    a transmitter of a signal input across said first and second terminals of said at least one of said first and second locations,
    binary encoding means connected to send digital signals to said transmitter;
said second signal means includes
    a receiver of a signal output across said first and second terminals of said other of said first and second locations.
    binary decoding means connected to receive digital signals from said receiver;
said digital signals at said signal input transferred in at least one direction to said signal output between said first and second locations without interfering as a result of the connections at said first and second locations with a supply of three-phase power;
each of said first and second means including
    three capacitors, one of which is connected to each one of said conductors and to one of said terminals,
    and an inductance having one of its ends connected to one of said terminals at a said location in series with said capacitors connected to said one of said terminals at that location.

12. The device of claim 10 wherein
said cable has three phase-conductors without a ground conductor extending through said cable.

13. The device of claim 10 wherein
said cable completes its circuitry through said cable with said three phase-conductors.

14. The device of claim 10 wherein
said first and second means further include
    a first galvanic separation transformer located between said first signal means and said terminals at one of said locations,
    a second galvanic separation transformer located between said second signal means and said terminals at the other of said locations.

15. The device of claim 11 wherein
said transmitter is located at said first location and is a remote control transmitter for providing input signals at said first location;
a remote information receiver is also located at said first location for receiving output signals at said first location;
said receiver is located at said second location and is a remote control receiver for receiving output signals at said second location corresponding to said input signals at said first location;
a remote information transmitter is also located at said second location to provide input signals at said second location corresponding to said output signals at said first location.

16. The device of claim 15 wherein a machine is connected to said cable beyond said second location to receive said power, said machine is controlled via said remote control transmitter, and said remote information receiver receives information on the status of said machine.

17. The device of claim 11 wherein said binary encoding means includes a first parallel-series converter and a biphase encoder; and said binary decoding means includes a second series-parallel converter and a decoding enable circuit to which an output of said second series-parallel converter is provided, said second series-parallel converter being adapted to check for credibility of the average value and the average duration of each received sequence.

18. The device of claim 17 wherein said binary encoding means is adapted to cyclically trigger said first parallel-series converter, and downstream of said receiver there is disposed a circuit for exploitation of redundancy of a cycle signalization signal.

* * * * *